(12) United States Patent
Montijo et al.

(10) Patent No.: US 12,399,861 B1
(45) Date of Patent: Aug. 26, 2025

(54) METHODS, SYSTEMS, AND COMPUTER READABLE MEDIA FOR APPLYING DIGITAL SIGNAL PROCESSOR (DSP) BLOCKS IN CONFIGURABLE SEQUENCES USING SORTING SWITCH

(71) Applicant: Keysight Technologies, Inc., Santa Rosa, CA (US)

(72) Inventors: Allen Montijo, Colorado Springs, CO (US); Caleb Remington Begly, Colorado Springs, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 60 days.

(21) Appl. No.: 18/533,951

(22) Filed: Dec. 8, 2023

(51) Int. Cl.
*G06F 15/82* (2006.01)
(52) U.S. Cl.
CPC ................................ *G06F 15/82* (2013.01)
(58) Field of Classification Search
None
See application file for complete search history.

(56) References Cited

U.S. PATENT DOCUMENTS

| | | | |
|---|---|---|---|
| 4,516,238 A * | 5/1985 | Huang | H04Q 3/68 370/411 |
| 5,630,153 A | 5/1997 | Intrater et al. | |
| 7,193,435 B2 | 3/2007 | Grabill et al. | |
| 7,729,459 B1 | 6/2010 | Kang et al. | |
| 8,290,758 B2 | 10/2012 | Aarts et al. | |
| 8,355,507 B1 * | 1/2013 | Beffa | H04K 1/00 398/166 |
| 8,989,329 B2 | 3/2015 | Hammad et al. | |
| 10,673,440 B1 * | 6/2020 | Camarota | G06F 7/483 |
| 11,119,929 B2 * | 9/2021 | Barner | G06F 12/0813 |
| 11,169,822 B2 * | 11/2021 | Camarota | G06F 13/4027 |
| 11,323,354 B1 | 5/2022 | Sommers | |
| 11,336,287 B1 * | 5/2022 | Rodriguez | G06F 15/7825 |
| 11,507,531 B2 * | 11/2022 | Luo | G06F 15/7871 |
| 11,520,717 B1 * | 12/2022 | Clarke | G06F 13/28 |
| 2010/0097979 A1 | 4/2010 | Shinozaki | |
| 2014/0133614 A1 | 5/2014 | Huntley et al. | |
| 2015/0100622 A1 | 4/2015 | Urban et al. | |

(Continued)

OTHER PUBLICATIONS

Commonly-assigned, co-pending U.S. Appl. No. 18/395,193 "Applying Digital Signal Processor (DSP) Blocks for Error Detection and Eye Diagram Generation" (Unpublished, Dec. 22, 2023).

(Continued)

*Primary Examiner* — Eric Coleman

(57) ABSTRACT

A method for applying digital signal processor (DSP) blocks in a configurable order includes providing a plurality of DSP blocks for performing a plurality of different signal processing operations on input data. The method further includes providing a sorting switch for connecting the DSP blocks together in a configurable order to implement a signal processing task. The method further includes configuring the sorting switch to apply the DSP blocks in a predetermined order to implement the signal processing task. The method further includes switching input data from the sorting switch to the DSP blocks in the predetermined order to implement the signal processing task.

18 Claims, 9 Drawing Sheets

(56) References Cited

U.S. PATENT DOCUMENTS

| | | | | |
|---|---|---|---|---|
| 2016/0196940 A1* | 7/2016 | Becker | ............ | H01P 1/15 335/103 |
| 2017/0135676 A1* | 5/2017 | Rothberg | ............ | A61B 8/488 |
| 2021/0013885 A1* | 1/2021 | Atsatt | ............ | H03K 19/17756 |
| 2022/0196735 A1* | 6/2022 | Atsatt | ............ | H03K 19/17768 |
| 2022/0397589 A1 | 12/2022 | Stein | | |

OTHER PUBLICATIONS

Commonly-assigned, co-pending U.S. Appl. No. 18/392,598 for "Methods, Systems, and Computer Readable Media for Providing a Network Test Environment With Mismatch Mediation Functionality" (Unpublished, filed Dec. 28, 2023).

How Do Measure the Bit Error Rate (BER) to a Given Confidence Level on the JBERTM8020A and the M8040A High-Performance BERT? Keysight Technologies, Inc. (Oct. 10, 2023).

Infiniium MXR-Series Data Sheet—pp. 1-45 Keysight Technologies, Inc. (Jun. 20, 2023).

Gao, Susan et al., "A novel architecture of recovered data comparison for high speed clock and data recovery," Stevens Institute of Technology, Proc. SPIE 5847, Noise in Communication Systems, pp. 179-187 (May 23, 2005).

Musa, Faisal A., "High-Speed Baud-Rate Clock Recovery," University of Toronto, pp. 1-141 (2008).

Moon, Un-Ku, et al, "Timing Recovery in CMOS using Nonlinear Spectral-line Method," AT&T Bell Laboratories, IEEE 1996 Custom Integrated C1 Rcuits Conference, pp. 13-16 (1996).

Bailey et al., "A Mixed-Signal RISC-V Signal Analysis SoC Generator With a 16-nm FinFET Instance", IEEE Journal of Solid-State Circuits, vol. 54 No. 10, pp. 1-16 (Oct. 2019).

Matthew Caesar, "Lecture 7: Switches", CS/ECE 438: Communication Networks, pp. 1-43 (Feb. 26, 2010).

"Example of Batcher Network for High Speed ATM Switch", http://doctord.webhop.net/courses/topics/networks/Topology/batcher.html, (Aug. 28, 2000).

* cited by examiner

METHODS, SYSTEMS, AND COMPUTER READABLE MEDIA FOR APPLYING DIGITAL SIGNAL PROCESSOR (DSP) BLOCKS IN CONFIGURABLE SEQUENCES USING SORTING SWITCH

TECHNICAL FIELD

The subject matter described herein relates to applying DSP blocks in configurable sequences. More particularly, the subject matter described herein relates to methods, systems, and computer readable media for applying, using a sorting switch, DSP blocks in configurable sequences.

BACKGROUND

Due to the unpredictable nature of signal processing applications, it is nearly impossible to future-proof a signal processing application specific integrated circuit (ASIC). That is, at design time, it is impossible to design an ASIC with enough functionality and flexibility to handle new algorithms and variations of existing algorithms in an efficient and effective manner.

One possible way to avoid the inflexibility of an ASIC design is to route data off of the ASIC to a field programmable gate array (FPGA) or a central processing unit (CPU) that implements new functionality required by a particular signal processing application and route the data back to the ASIC after off-chip processing is performed. However, routing data off of and back to an ASIC increases latency in signal processing applications because FPGAs and CPUs are usually slower than ASICs in performing a given signal processing task. In addition, routing data off of and back to an ASIC also increases latency.

One possible way to avoid the latency of switching data off of and back to an ASIC is to use DSP blocks to implement different signal processing tasks and switch in the DSP blocks to implement the signal processing tasks. A problem with this approach is that it requires too many gates to justify its implementation. If a crossbar switch is used, the complexity of the switch increases in complexity as the product of the number of inputs and outputs. The associated wiring congestion also makes routing of signals difficult. Accordingly, in light of these and other difficulties, there exists a need for improved methods, systems, and computer readable media for applying DSP blocks in arbitrary sequences to implement signal processing tasks.

SUMMARY

A method for applying digital signal processor (DSP) blocks in a configurable order includes providing a plurality of DSP blocks for performing a plurality of different signal processing operations on input data. The method further includes providing a sorting switch for connecting the DSP blocks together in a configurable order to implement a signal processing task. The method further includes configuring the sorting switch to apply the DSP blocks in a predetermined order to implement the signal processing task. The method further includes switching input data from the sorting switch to the DSP blocks in the predetermined order to implement the signal processing task.

According to another aspect of the subject matter described herein, providing the DSP blocks includes providing DSP blocks for processing digitized data for an oscilloscope trace.

According to another aspect of the subject matter described herein, providing the DSP blocks for processing the digitized data for the oscilloscope trace includes providing at least one arithmetic logic unit (ALU) block, at least one filter, at least one up converter, and at least one down converter.

According to another aspect of the subject matter described herein, the sorting switch comprises a batcher switch.

According to another aspect of the subject matter described herein, providing the batcher switch includes providing the batcher switch including a plurality of data input ports and a plurality of data output ports.

According to another aspect of the subject matter described herein, configuring the sorting switch includes configuring the batcher switch by writing destination port information to control registers associated with the data input ports, wherein the destination port information written to the control registers controls which ones of the DSP blocks are applied to the input data and the predetermined order in which the DSP blocks are applied to the input data.

According to another aspect of the subject matter described herein, configuring the sorting switch includes configuring the batcher switch to apply different ones of the DSP blocks to different streams of input data.

According to another aspect of the subject matter described herein, configuring the sorting switch includes configuring the sorting switch to split a stream of input data into two streams, process the streams using different ones of the DSP blocks, and combine the streams.

According to another aspect of the subject matter described herein, switching the input data from the sorting switch to the DSP blocks includes forwarding the input data from the sorting switch to a first DSP block, from the first DSP block to the sorting switch, and from the sorting switch to a second DSP block.

According to another aspect of the subject matter described herein, the method for applying DSP blocks in a configurable order includes providing a plurality of the sorting switches and a plurality of the DSP blocks accessible via each of the sorting switches.

According to another aspect of the subject matter described herein, a system for applying digital signal processor (DSP) blocks in a configurable order is provided. The system includes a plurality of DSP blocks for performing a plurality of different signal processing operations on input data. The system further includes a sorting switch for connecting the DSP blocks together, the sorting switch being configurable for applying the DSP blocks in a predetermined order to implement the signal processing task and for switching input data from the sorting switch to the DSP blocks in the predetermined order to implement the signal processing task.

According to another aspect of the subject matter described herein, the DSP blocks are configured to process digitized data for an oscilloscope trace.

According to another aspect of the subject matter described herein, the DSP blocks include at least one arithmetic logic unit (ALU) block, at least one filter, at least one up converter, and at least one down converter.

According to another aspect of the subject matter described herein, the sorting switch comprises a batcher switch.

According to another aspect of the subject matter described herein, the batcher switch includes a plurality of data input ports and a plurality of data output ports.

According to another aspect of the subject matter described herein, the batcher switch is configurable by writing destination port information to control registers associated with the data input ports, wherein the destination port information written to the control registers controls which ones of the DSP blocks are applied to the input data and the predetermined order in which the DSP blocks are applied to the input data.

According to another aspect of the subject matter described herein, the batcher switch is configurable to apply different ones of the DSP blocks to different streams of input data.

According to another aspect of the subject matter described herein, the batcher switch is configurable to split a stream of input data into two streams, process the streams using different ones of the DSP blocks, and combine the streams.

According to another aspect of the subject matter described herein, the sorting switch is configurable to switch the input data from the sorting switch to a first DSP block, from the first DSP block to the sorting switch, and from the sorting switch to a second DSP block.

According to another aspect of the subject matter described herein, the system includes a plurality of the sorting switches and a plurality of the DSP blocks accessible via each of the sorting switches.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

To avoid the static nature of ASIC design and provide flexible signal processing functionality, the subject matter described herein implements signal processing functions as DSP blocks and provides for flexible application of the DSP blocks to input data using a programmable switch, such as a batcher switch. A batcher switch is a sorting switch that has conventionally been used in communications networks, such as asynchronous transfer mode (ATM) networks, to switch data transmitted over virtual circuits. The subject matter described herein uses a batcher switch to apply DSP blocks in user-configurable sequences to process input data. In one example, the input data is digitized signal data within an oscilloscope. Using a batcher switch, the switching complexity increases as the logarithm of the number of input/output (I/O) ports (O(N log^2N), where N is the number of I/O ports). This simplification over a using a crossbar switch (switching complexity O(N^2)) enables a pool of general purpose DSP blocks to be arbitrarily ordered and inserted into different points of a data processing path.

Figure 1:
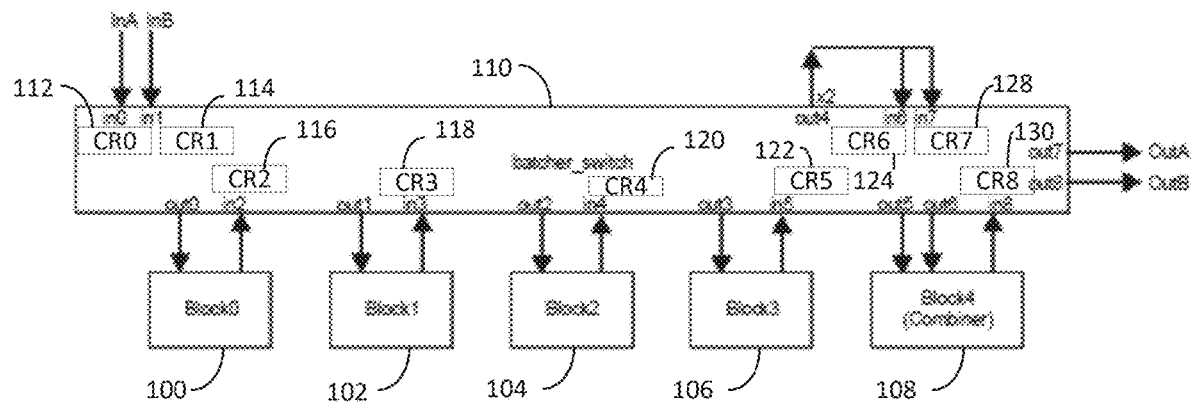
FIG. 1 is a block diagram illustrating an example system with a variety of generic DSP blocks connected to an 8×8 batcher switch.

To arbitrarily order DSP blocks, the control register associated with each input port of a batcher switch must be written to with a value that indicates the desired output port of the batcher switch that is connected to the input of the next DSP block in the desired sequence or order. The programming of the batcher switch is performed in advance of processing input data. The following examples show how different batcher switch programmings can be used to reorder blocks and perform simple tasks, such as handling multiple independent processing pipes, a split pipe situation, and a merging situation. FIG. 1 shows an example system with a variety of generic DSP blocks connected to an 8×8 batcher switch. In FIG. 1, DSP blocks 100-108 implement signal processing tasks and are each connected to at least one input port and at least one output port of a batcher switch 110. For example, DSP block0 100 is connected to output port out0 and input port in2, DSP block1 102 is connected to output port out1 and input port in3, DSP block2 104 is connected to output port out2 and input port in4, DSP block3 106 is connected to output port out3 and input port in5, and DSP block4 108 is connected to output ports out5 and out6 and input port in8. Each input port has an associated control register CR0-CR8 112-130. The value written to the control register controls the destination output port that will be connected to the input port. For example, if the value written to CR0 112 is 3, data input to input port in0 will be forwarded to output port out3, which is connected to the input of DSP block3 106. DSP block3 106 will process the data and provide the data back to batcher switch 110 via input port in5. The value written to control register CR5 122 will determine the output port of batcher switch 110 to which the data will next be forwarded to access the next DSP block in the desired order or sequence. Thus, by writing data to control registers of a batcher switch, DSP blocks can be applied to input data in arbitrary orders.

Figure 2:
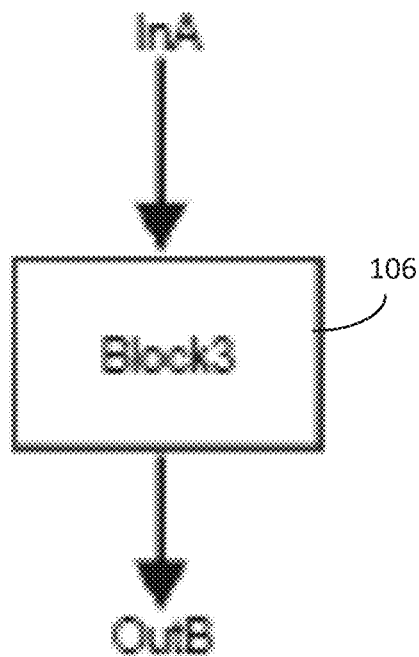
FIG. 2 is a block diagram illustrating an example system where the batcher switch in FIG. 1 is configured to apply a single DSP block to input data.

FIG. 2 is an example where the batcher switch in FIG. 1 is configured to apply a single DSP block, block2 104, to input data. The example illustrated in FIG. 2 corresponds to a use case for a run cycle where the input data passes from input signal line InA, through block3 106, and out to output signal line OutB. To do this, batcher switch 110 is configured by writing values to the control registers to make connections between input ports and output ports of batcher switch 110 via DSP blocks. For example, the value for output port out3 is written to control register CR0 112 to connect input port in0 to the input of DSP block3 106. The value for output port out8 is written to control register CR5 112 to connect input port in5, which receives the data output from DSP block3 106 to output port out8. For all the remaining input ports of batcher switch 110, a globally unique value is written to the control register to avoid collisions. Enable bits out[i]_enable are set to 1 for output ports out3, and out8, since these output ports are used. Enable bits for the remaining output ports are set to 0 to disable the remaining output ports of batcher switch 110. Once batcher switch 110 is configured in this manner, data input to batcher switch 110 via input port in0 passes from batcher switch 110 through DSP block3 106, back to batcher switch 110, and exits batcher switch 110 via output port out8.

Figure 3:
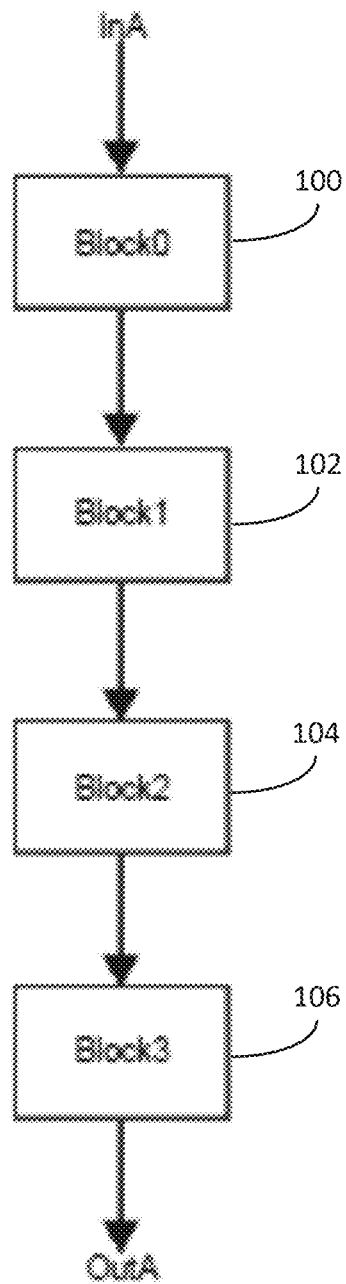
FIG. 3 is a block diagram illustrating an example system where the batcher switch of FIG. 1 is configured to apply DSP blocks in ascending order.

FIG. 3 is another example where batcher switch 110 is configured to apply DSP blocks 100-106 in ascending order. When batcher switch 110 is configured as illustrated in FIG. 3, the data proceeds from input signal line InA to output signal line OutA through DSP blocks block0 100-block3 106 in ascending order. This ordered application of DSP blocks is achieved by writing the value for output port out0 to control register CR0 112 associated with input port in0, which connects input port in0 to output port out0. The value for output port out1 is written to control register CR2 116 associated with input port in2 to connect input port in2 to output port out1. The value for output port out2 is written to control register CR3 118 to connect input port in3 to output port out2. The value for output port out3 is written to CR4 120 to connect input port in4 to output port out3. The value for output port out7 is written to control register CR5 122 to connect input port in5 to output port out7. For the remaining inputs, a unique value is written to their respective control registers to avoid collisions. Enable bits out[i]_enable are set to 1 for all used of the output ports being used. Enable bits out[i]_enable are set to 0 to disable the remaining output ports. Once batcher switch 110 is configured in this manner, data input to input port in0 will be routed to from batcher switch 110 to DSP block0 100, from DSP block0 100 back to batcher switch 110, from batcher switch 110 to DSP block1 102, from DSP block1 102 back to batcher switch 110, from batcher switch 110 to DSP block2 104, from DSP block2 104 to batcher switch 110, from batcher switch 110 to DSP block3 106, from DSP block3 106 to batcher switch 110, and from batcher switch 110 to output port out7.

Figure 4:
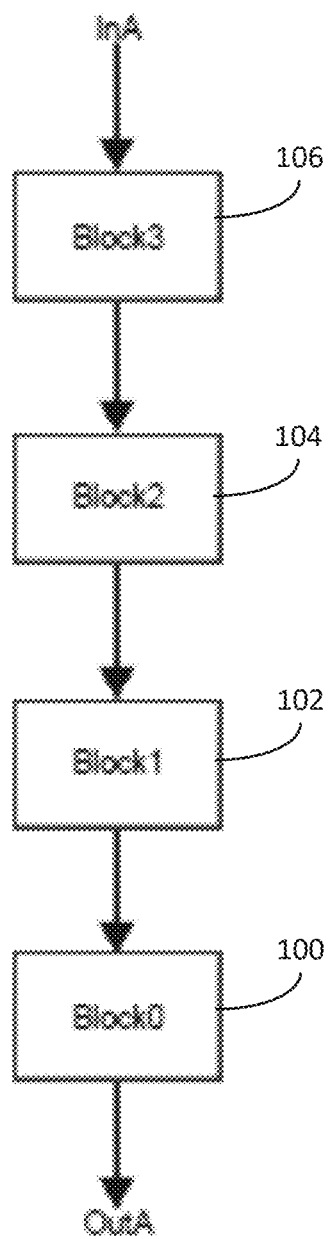
FIG. 4 is a block diagram illustrating an example where the batcher switch of FIG. 1 is configured to apply DSP blocks in descending order.

FIG. 4 illustrates an example where the batcher switch is configured to apply DSP blocks in descending order. In this use case, data will be routed from signal line InA, through DSP blocks 3-0 in descending order, and to output signal line OutA. This ordered application of DSP blocks is achieved by writing the value for output port out3 to control register CR0 112 associated with input port in0, which connects input port in0 to output port out3, which is connected to the input of DSP block3 106. The value for output port out2 is written to control register CR5 122 associated with input port in5 to connect input port in5, which is connected to the output of DSP block3 106 to output port out2, which is connected to the input of DSP block2 104. The value for output port out1 is written to control register CR4 118 to connect input port in4, which is connect to the output of DSP block2 104, to output port out1, which is connected to the input of DSP block1 102. The value for output port out0 is written to CR3 118 to connect input port in3, which is connected to the output of DSP block1 102, to output port out0, which is connected to the input of DSP block0 100. The value for output port out7 is written to control register CR2 118 to connect input port in2, which is connected to the output of DSP block0 100, to output port out7, which is connected to output signal line OutA. For the remaining inputs, a unique value is written to their respective control registers to avoid collisions. The enable bit out[i]_enable is set to 1 for all used outputs. The enable bit out[i]_enable is set to 0 for all unused outputs. Once batcher switch 110 is configured in this manner, input data from signal line InA is routed from batcher switch to DSP block3 106, from DSP block3 106 to batcher switch 110, from batcher switch 110 to DSP block 2 104, from DSP block2 104 to batcher switch 110, from batcher switch 110 to DSP block1 102, from DSP block1 102 to batcher switch 110, from batcher switch 110 to DSP block0 100, from DSP block0 100 to batcher switch 110, and from batcher switch 110 to output signal line OutA.

Figure 5:
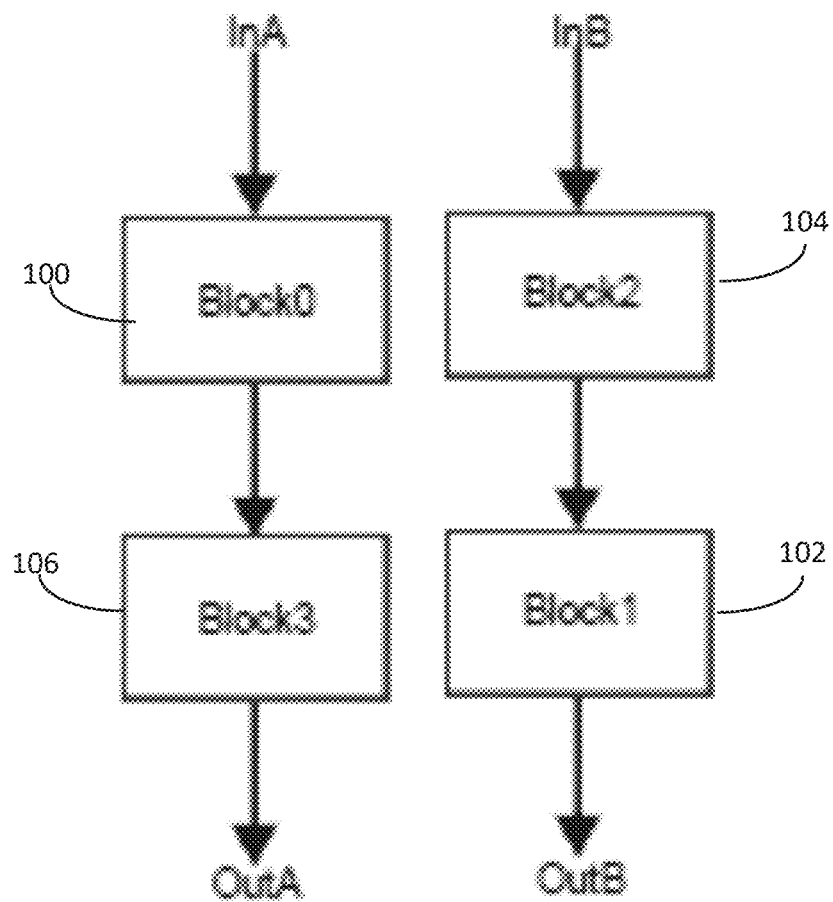
FIG. 5 is a block diagram illustrating an example where the batcher switch of FIG. 1 is configured to apply DSP blocks in separate paths.

FIG. 5 illustrates yet another ordering of DSP blocks that can be implemented using batcher switch 110. In this use case, batcher switch 110 is configured to create two paths that are independent from each other: a path from signal line InA to signal line OutA that passes through DSP block0 100 and DSP block3 106 and a path from signal line InB to signal line OutB that passes through DSP block2 104 and DSP block1 102. To implement this application of DSP blocks, batcher switch 110 can be configured by writing the following values to the control registers. The value for output port out0 is written to control register CR0 112 to connect input signal line InA to the input of DSP block0 100. The value for output port out3 is written to control register CR2 116 to connect the output of block0 100 to the input of block3 106. The value for output port out7 is written to control register CR5 122 to connect the output of DSP block3 106 to output signal line OutA.

To configure the parallel path from input signal line InB to output signal line OutB through DSP block2 104 and DSP block1 102, the value for output port out2 is written to control register CR1 104 to connect input signal line InB to the input of DSP block2 104. The value for output port out1 is written to control register CR4 120 to connect the output of DSP block2 104 to the input of DSP block1 102. The value for output port out8 is written to control register CR3 118 to connect the output DSP block1 102 to output signal line OutB. For the remaining input ports, a unique value is written to their respective control registers to avoid collisions. The enable bit out[i]_enable is set to 1 for all used outputs. The enable bit out[i]_enable is set to 0 for all unused outputs.

Figure 6:
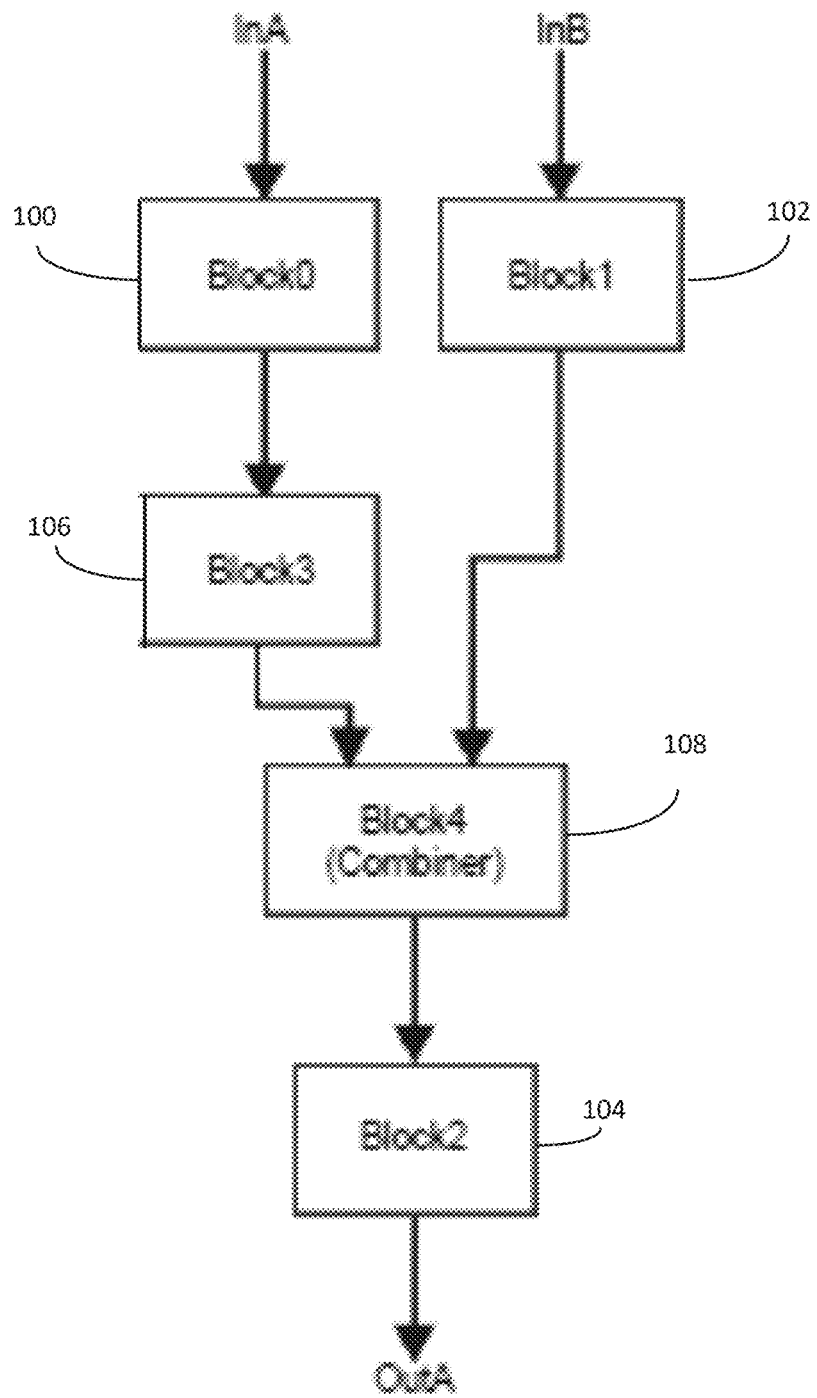
FIG. 6 is a block diagram where the batcher switch of FIG. 1 is configured to receive data from different inputs, initially apply different DSP processing blocks to the input data, combine the separate streams of input data, and then apply the same DSP block to the combined input data.

FIG. 6 illustrates yet another use case in which batcher switch 110 is configured to receive data from different inputs, initially apply different DSP processing blocks to the input data, combine the separate streams of input data, and then apply the same DSP block to the combined input data. In this use case, data is input from both input signal lines InA and InB, the data from InA is passed through preprocessing DSP blocks block0 100 and block3 106, the data from input signal line InB is passed through preprocessing DSP block block1 102, the data is combined and passed through post-processing DSP block block2 104. The resulting output data from block2 104 is sent to output signal line OutA. Batcher switch 110 is configured as follows to implement the ordering illustrated in FIG. 6. The value for output port out0 is written to control register CR0 112 to connect input signal line InA to the input of DSP block0 100. The value for output port out3 is written to control register CR2 116 to connect the output of DSP block0 100 to the input of DSP block 3 106. The value for output port out5 is written to control register CR5 122 to connect the output of DSP block3 106 to one of the inputs of DSP block4 108. The value four output port out1 is written to control register CR1 114 to connect input signal line InB to the input of DSP block1 102. The value for output port out6 is written to control register CR3 118 to connect the output of DSP block1 102 to the other input of DSP block4 108. The value for output port out2 is written to control register CR8 130 to connect the output of DSP block4 108 to the input of DSP block2 104. The value four output port out7 is written to control register CR4 120 to connect the output of DSP block2 104 to output signal line OutA. The control registers of all of the remaining input ports are set to a unique value so there are no collisions. The enable bit out[i]_enable is set to 1 for all used outputs. The enable bit out[i]_enable is set to 0 for all unused outputs.

Figure 7:
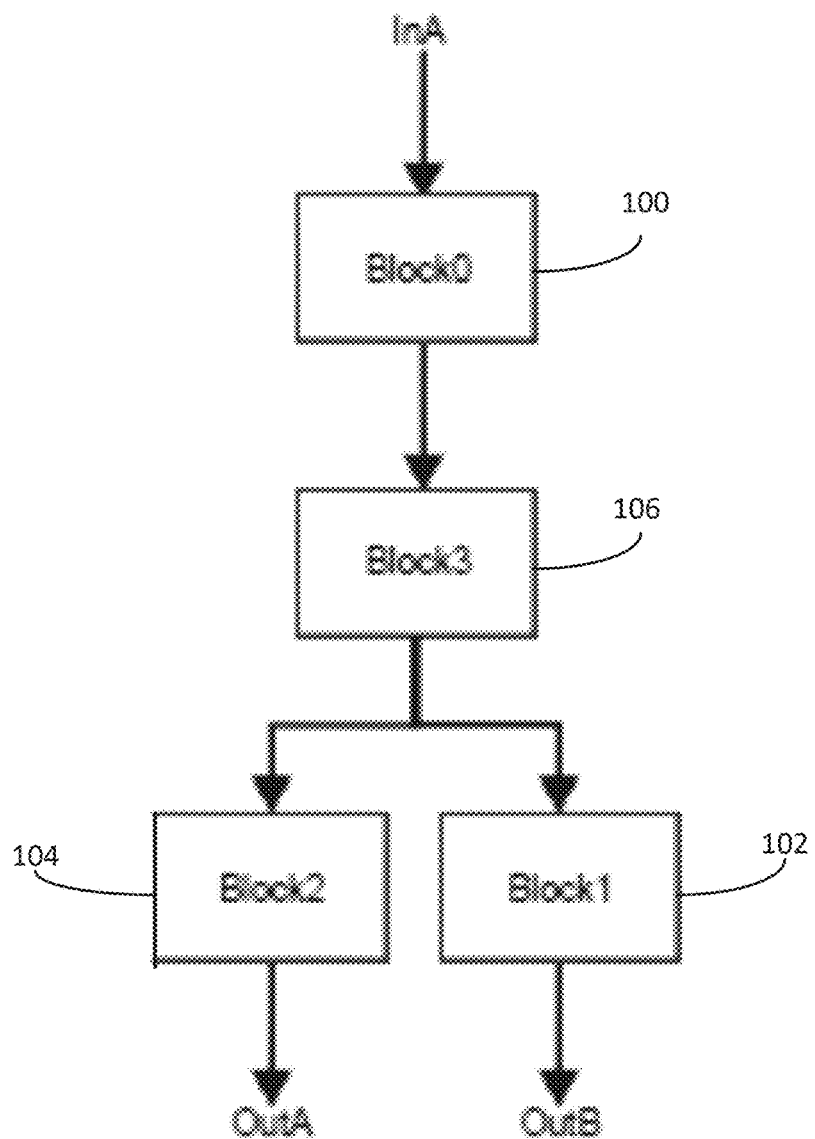
FIG. 7 is a block diagram illustrating a system where the batcher switch of FIG. 1 is configured to duplicate, split, and process data using different DSP blocks.

FIG. 7 illustrates yet another use case in which batcher switch 110 is used to duplicate, split, and process data using different DSP blocks. To perform this processing, batcher switch 110 may be programmed as follows. The value for output port out0 is written to control register CR0 112 to connect the input signal line InA to the input of DSP block0 100. The value for output port out3 is written to control register CR2 116 to connect the output of DSP block0 100 to the input of DSP block3 106. The value for output port out4 is written to control register CR5 122 to connect the output of DSP block3 106 to output port out4, which can duplicate data since one of its outputs is connected to input port in6 and the other of its outputs is connected to input port in7. The value for output port out2 is written to control register CR6 124 to connect the duplicated data to the input of DSP block2 104. The value for output port out7 is written to control register CR4 120 to connect the output of DSP block2 104 to output signal line OutA. The value for output port out1 is written to control register CR7 128 to connect the duplicated data to the input of DSP block1 102. The value for output port out8 is written to control register CR3 118 to connect the output of DSP block1 102 to output signal line OutB. For the remaining input ports, the corresponding control register destination is set port to a unique output so there are no collisions. Enable bits out[i]_enable are set to 1 for all used outputs. The enable bits for the remaining output ports are set to 0. It should be noted that out4_enable has two bits (one for each duplicated output), and both should be enabled in this case.

Figure 8:
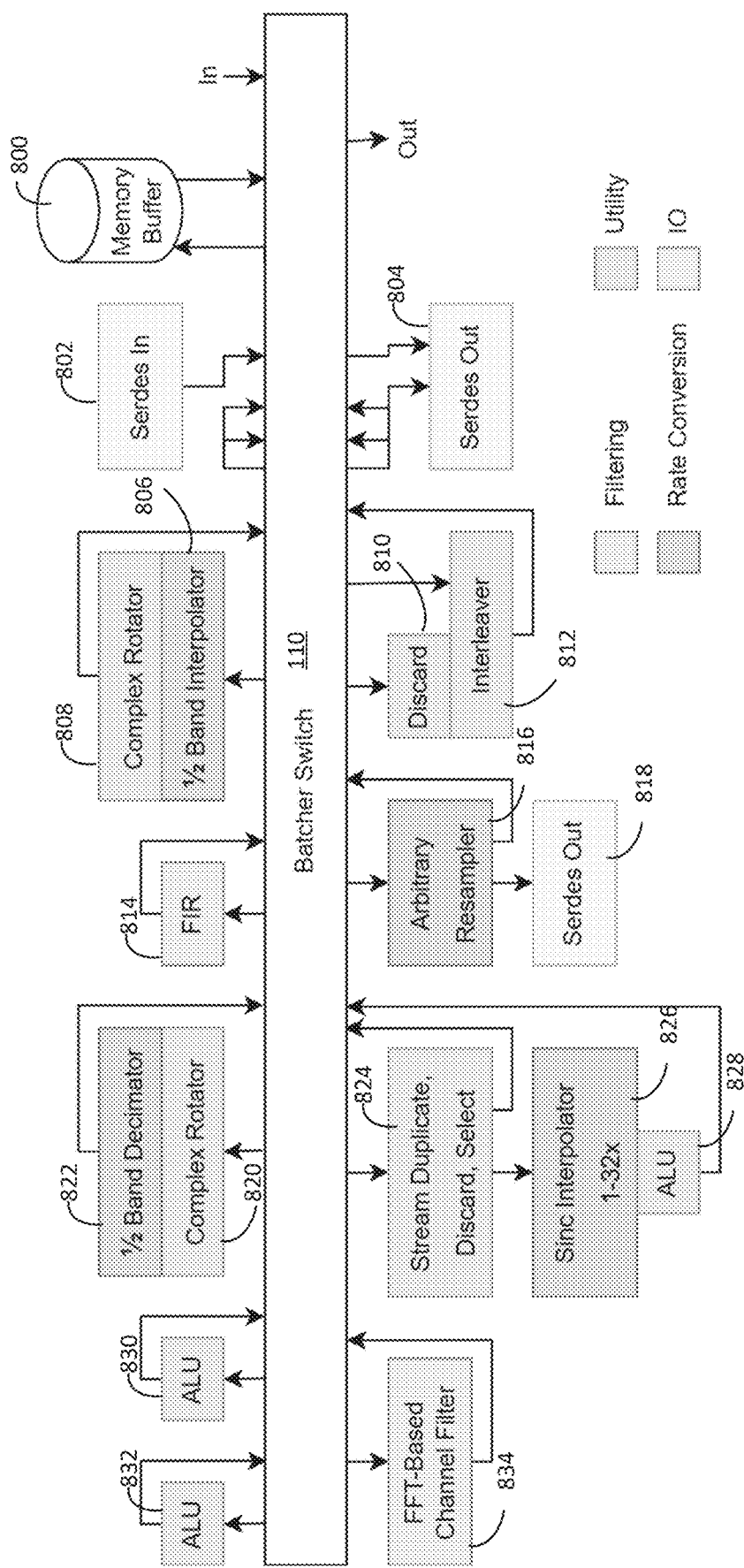
FIG. 8 is a block diagram illustrating a system where DSP blocks configured to process digitized signal data within an oscilloscope are connected to a batcher switch.

FIG. 8 is a block diagram illustrating a system in which DSP blocks configured to process digitized signal data within an oscilloscope are connected to a batcher switch Referring to FIG. 8, batcher switch 110 includes internal ports connected to DSP blocks 800-834. DSP blocks 800-834 are configured to process or store signal data within an oscilloscope. The DSP blocks include a memory buffer 800 that can temporarily store input data being processed by the DSP blocks connected to batcher switch 110. The DSP blocks further include a serializer/deserializer (serdes) in block 802 and a serdes out block 804 that respectively perform serializing and deserializing functions for input data from other parts of the DSP that includes batcher switch 110 (including DSP blocks connected to other batcher switches) and data being output to other parts of the DSP.

The DSP blocks further include a half-band interpolator 806 followed by a complex rotator 808 that up-sample input data. The DSP blocks further include a discard block 810 and an interleaver 812. Discard block 810 discards some number of input data samples from the beginning of a stream to allow time-aligning of the stream with the other data input to interleaver 812. The DSP blocks further include a finite impulse response (FIR) block 814 that performs FIR time-domain filtering of data. The DSP blocks further include an arbitrary resampler 816 that resamples input data at a specified rate. The DSP blocks further include another serdes out block 818 that performs serdes functions for data being output to another part of the DSP.

The DSP blocks further include a complex rotator 820 followed by a half-band decimator 822 that down-sample input data. The DSP blocks further include a stream duplicate, discard, and select block 824 that duplicates, partially discards, or selects (portions of) an input data stream. The DSP blocks further include a sinc interpolator 826 that performs sinc interpolation of input data. The DSP blocks further include arithmetic logic unit (ALU) blocks 828, 830, and 832 that perform arithmetic operations (add, subtract, multiply, divide, scale, differentiate, integrate, re-encode, square, absolute value, etc.) on input data. The DSP blocks further include a fast Fourier transform (FFT)-based channel filter block 834 that performs FFT-based channel filtering of input data.

DSP blocks 800-834 can be applied in arbitrary orders or sequences to process signal data within an oscilloscope by writing to control registers (not shown in FIG. 8) of batcher switch 110 to define the order of the DSP blocks to applied to a given data run and then switching the data through the DSP blocks in the defined order. Data can also be duplicated, combined, and split, in the manner described above with respect to FIGS. 1-7. Batcher switches that are connected to different DSP blocks can be connected together so that DSP blocks connected to different DSP blocks can be arbitrarily ordered.

Figure 9:
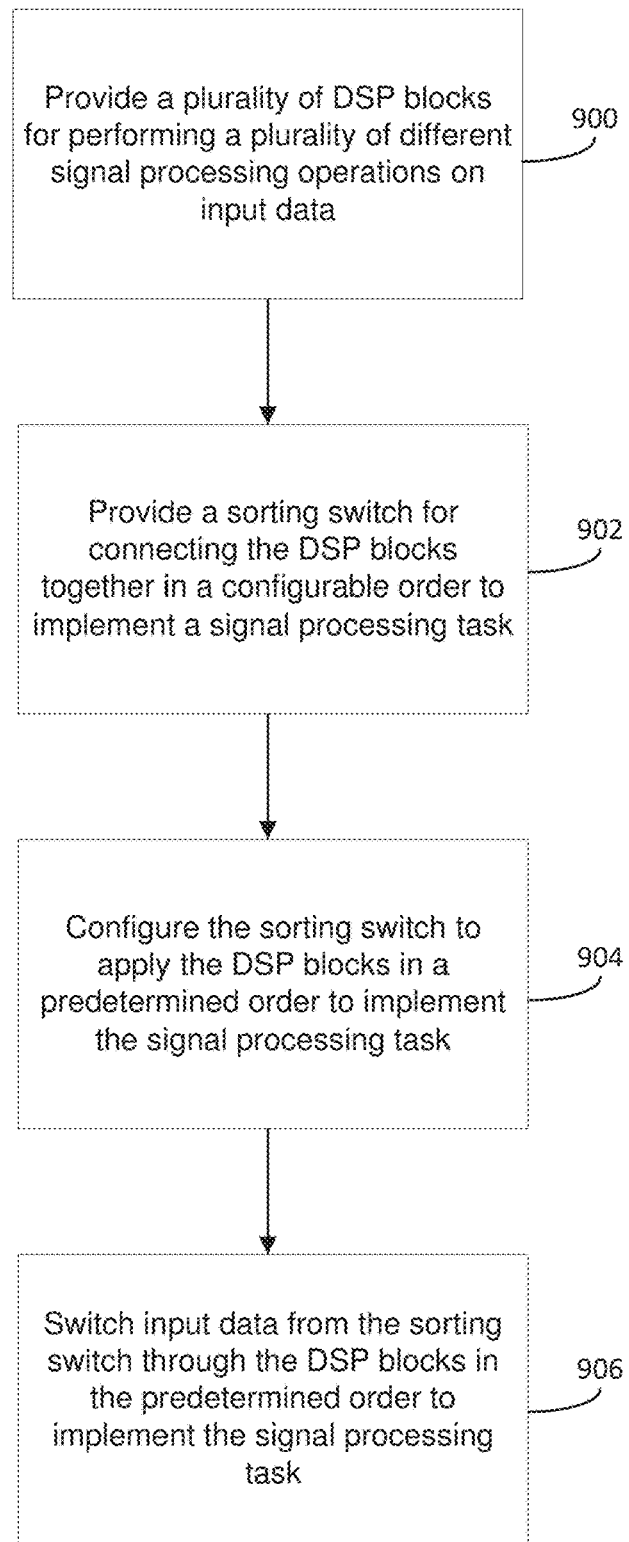
FIG. 9 is a flow chart illustrating an exemplary process for applying DSP blocks in a configurable order to perform a signal processing task.

FIG. 9 is a flow chart illustrating an exemplary process for applying DSP blocks in a configurable order to perform a signal processing task. Referring to FIG. 9, in step 900, the process includes providing a plurality of DSP blocks for performing a plurality of different signal processing operations on input data. For example, DSP blocks for performing signal processing tasks, such as waveform mathematics operations, filtering applications, up converting operations, down converting operations, etc., may be provided.

In step 902, the process includes providing a sorting switch for connecting the DSP blocks together in a configurable order to implement a signal processing task. For example, the DSP blocks may be connected to a sorting switch, such as a batcher switch.

In step 904, the process includes configuring the sorting switch to apply the DSP blocks in a predetermined order to implement the signal processing task. For example, prior to processing input data, the batcher switch can be configured by writing destination port data to the control registers associated with input ports of the batcher switch connected to DSP block outputs such that data output from a DSP block will be switched to the specified output ports.

In step 906, the process includes switching input data from the sorting switch through the DSP blocks in the predetermined order to implement the signal processing task. For example, after the batcher switch is configured, ingress data will be switched through the batcher switch such that the DSP blocks are applied in the configured order.

In the example mentioned above, batcher switch 110 controls the application of DSP blocks to signal data within an oscilloscope. The subject matter described herein is not limited to using batcher switch 110 to control application of DSP blocks within an oscilloscope. In other examples, batcher switch 110 can be used to control application of DSP blocks within other signal receivers and sources, such as spectrum analyzers, network analyzers, and signal generators.

In the example illustrated in FIG. 8, the order in which the DSP blocks are applied is achieved by writing the value or identifier of an output port of batcher switch 110 to a control register associated with an input port of batcher switch 110. In an alternate example, the order in which the DSP blocks are applied can be achieved by writing a value or identifier of an input port of batcher switch 110 to a control register associated with an output port of batcher switch 110.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for applying digital signal processor (DSP) blocks in a configurable order, the method comprising:
    providing a plurality of DSP blocks for performing a plurality of different signal processing operations on input data;
    providing a sorting switch including a plurality of data input ports and a plurality of data output ports for connecting the DSP blocks together in a configurable order to implement a signal processing task, wherein each of the DSP blocks is connected to at least one of the data input ports of the sorting switch and at least one of the data output ports of the sorting switch and data flows from the data output ports of the sorting switch, through the DSP blocks, and back to the sorting switch via the data input ports;
    configuring the sorting switch to apply the DSP blocks in a predetermined order to implement the signal processing task, wherein configuring the sorting switch to apply the DSP blocks includes writing values to control registers associated with the data input ports of the sorting switch that identify data output ports of the sorting switch to which data entering the sorting switch via the data input ports should be forwarded such that any of the DSP blocks is accessible via any of the data input ports; and
    switching input data from the sorting switch to the DSP blocks in the predetermined order to implement the signal processing task.

2. The method of claim 1 wherein providing the DSP blocks includes providing DSP blocks for processing digitized data for an oscilloscope trace.

3. The method of claim 2 wherein providing the DSP blocks for processing the digitized data for the oscilloscope trace includes providing at least one arithmetic logic unit (ALU) block, at least one filter, at least one up converter, and at least one down converter.

4. The method of claim 1 wherein the sorting switch comprises a batcher switch.

5. The method of claim 4 wherein configuring the sorting switch includes configuring the batcher switch by writing the values to the control registers to control which ones of the DSP blocks are applied to the input data and the predetermined order in which the DSP blocks are applied to the input data.

6. The method of claim 4 wherein configuring the sorting switch includes configuring the batcher switch to apply different ones of the DSP blocks to different streams of input data.

7. The method of claim 4 wherein configuring the sorting switch includes configuring the sorting switch to split a stream of input data into two streams, process the streams using different ones of the DSP blocks, and combine the streams.

8. The method of claim 1 wherein switching the input data from the sorting switch to the DSP blocks includes forwarding the input data from the sorting switch to a first DSP block, from the first DSP block to the sorting switch, and from the sorting switch to a second DSP block.

9. The method of claim 1 comprising providing a plurality of the sorting switches and a plurality of the DSP blocks accessible via each of the sorting switches.

10. A system for applying digital signal processor (DSP) blocks in a configurable order, the system comprising:
    a plurality of DSP blocks for performing a plurality of different signal processing operations on input data; and
    a sorting switch including a plurality of data input ports and a plurality of data output ports for connecting the DSP blocks together, the sorting switch being configurable for applying the DSP blocks in a predetermined order to implement the signal processing task and for switching input data from the sorting switch to the DSP blocks in the predetermined order to implement the signal processing task, wherein each of the DSP blocks is connected to at least one of the data input ports of the sorting switch and at least one of the data output ports of the sorting switch and data flows from the data output ports of the sorting switch, through the DSP blocks, and back to the sorting switch via the data input ports and wherein the sorting switch is configurable to apply the DSP blocks by writing values to control registers associated with the data input ports of the sorting switch that identify data output ports of the sorting switch to which data entering the sorting switch via the data input ports should be forwarded such that any of the DSP blocks is accessible via any of the data input ports.

11. The system of claim 10 wherein the DSP blocks are configured to process digitized data for an oscilloscope trace.

12. The system of claim 11 wherein the DSP blocks include at least one arithmetic logic unit (ALU) block, at least one filter, at least one up converter, and at least one down converter.

13. The system of claim 10 wherein the sorting switch comprises a batcher switch.

14. The system of claim 13 wherein the batcher switch is configurable by writing the values to the control registers to control which ones of the DSP blocks are applied to the input data and the predetermined order in which the DSP blocks are applied to the rut data.

15. The system of claim 13 wherein the batcher switch is configurable to apply different ones of the DSP blocks to different streams of input data.

16. The system of claim 13 wherein the batcher switch is configurable to split a stream of input data into two streams, process the streams using different ones of the DSP blocks, and combine the streams.

17. The system of claim 10 wherein the sorting switch is configurable to switch the input data from the sorting switch to a first DSP block, from the first DSP block to the sorting switch, and from the sorting switch to a second DSP block.

18. The system of claim 10 comprising a plurality of the sorting switches and a plurality of the DSP blocks accessible via each of the sorting switches.

* * * * *

UNITED STATES PATENT AND TRADEMARK OFFICE
CERTIFICATE OF CORRECTION

PATENT NO. : 12,399,861 B1  
APPLICATION NO. : 18/533951  
DATED : August 26, 2025  
INVENTOR(S) : Allen Montijo et al.

Page 1 of 1

It is certified that error appears in the above-identified patent and that said Letters Patent is hereby corrected as shown below:

In the Claims

Column 10, Line 64, in Claim 14, delete "rut" and insert -- input --.

Signed and Sealed this  
Fourth Day of November, 2025

John A. Squires  
*Director of the United States Patent and Trademark Office*